(12) United States Patent
Yoshida et al.

(10) Patent No.: US 11,515,607 B2
(45) Date of Patent: Nov. 29, 2022

(54) METHOD OF INTERRUPTING INFLOW CURRENT IN BATTERY SYSTEM

(71) Applicant: SANYO Electric Co., Ltd., Daito (JP)

(72) Inventors: Naotake Yoshida, Hyogo (JP);
Kazuhiro Harazuka, Hyogo (JP);
Nobuo Iwatsuki, Hyogo (JP); Shinji Ota, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 55 days.

(21) Appl. No.: 16/964,051

(22) PCT Filed: Nov. 15, 2018

(86) PCT No.: PCT/JP2018/042199
§ 371 (c)(1),
(2) Date: Jul. 22, 2020

(87) PCT Pub. No.: WO2019/150704
PCT Pub. Date: Aug. 8, 2019

(65) Prior Publication Data
US 2021/0050582 A1 Feb. 18, 2021

(30) Foreign Application Priority Data
Jan. 31, 2018 (JP) .............................. JP2018-015817

(51) Int. Cl.
*H01M 50/578* (2021.01)
*H01M 50/502* (2021.01)
*H01M 50/20* (2021.01)

(52) U.S. Cl.
CPC ......... *H01M 50/578* (2021.01); *H01M 50/20* (2021.01); *H01M 50/502* (2021.01); *H01M 2200/20* (2013.01)

(58) Field of Classification Search
None
See application file for complete search history.

(56) References Cited

U.S. PATENT DOCUMENTS

| 2010/0167116 A1 | 7/2010 | Okada | |
|---|---|---|---|
| 2010/0227205 A1* | 9/2010 | Byun | H01M 50/103 429/61 |

(Continued)

FOREIGN PATENT DOCUMENTS

| JP | 2010-157451 A | 7/2010 |
|---|---|---|
| JP | 2017-59346 A | 3/2017 |
| WO | 2011/151981 A1 | 12/2011 |

OTHER PUBLICATIONS

Translation of International Search Report dated Feb. 19, 2019, issued in counterpart Application No. PCT/JP2018/042199. (2 pages).

(Continued)

*Primary Examiner* — Ula C Ruddock
*Assistant Examiner* — Kevin K Eng
(74) *Attorney, Agent, or Firm* — WHDA, LLP

(57) ABSTRACT

There is provided a battery system including parallel-connected bus bars each connecting the plurality of prismatic battery cells in parallel, and a safety mechanism configured to be capable of interrupting a current path of prismatic battery cells connected in parallel by the parallel-connected bus bars, where the sealing plate of one of the prismatic battery cells convexly deforms due to a rise in an internal pressure of this prismatic battery cell when an abnormality occurs, the sealing plate that has convexly deformed comes into contact with the parallel-connected bus bars to form external short circuitry between the electrode terminals that are positive and negative of one prismatic battery cell connected in parallel to the prismatic battery cell with the abnormality, and external short circuitry activates the safety mechanism that interrupts a current flowing into the prismatic battery cell with the abnormality.

5 Claims, 9 Drawing Sheets

(56) References Cited

U.S. PATENT DOCUMENTS

2012/0135296 A1    5/2012  Itoi et al.
2015/0207131 A1*  7/2015  Han .................... H01M 50/502
                                                            429/61
2019/0181402 A1*  6/2019  Bude ..................... H01M 50/20

OTHER PUBLICATIONS

Extended European Search Report dated Feb. 12, 2021, issued in counterpart EP application No. 18904447.2. (8 pages).

* cited by examiner

METHOD OF INTERRUPTING INFLOW CURRENT IN BATTERY SYSTEM

TECHNICAL FIELD

The present invention relates to a battery system, a method for interrupting an inflow current of the battery system, and an electric vehicle and a power supply device including the battery system. The present invention particularly relates to a battery system optimal for a power source of a motor that is mounted in an electric vehicle and runs the vehicle, such as a hybrid vehicle, fuel cell vehicle, electric car, and electric motorcycle, and relates to a method for interrupting an inflow current of the battery system.

BACKGROUND ART

Battery systems including a plurality of battery cells that are stacked are used for various purposes. Such a battery system can output larger current by a plurality of adjacent battery cells connected in parallel, and output higher electric power by the parallel-connected battery cells connected in series to each other. Thus, such battery systems are preferably employed for application that requires higher output power.

When such a battery system uses high-performance secondary batteries such as lithium-ion secondary batteries, it is necessary to design the battery system in consideration that extremely large current may flow through a battery cell due to an internal short circuit and the battery cell may undergo thermal runaway. When thermal runaway occurs, temperature of the battery may rise rapidly to reach an extremely high temperature of 400° C. or higher. Particularly, in the battery system including a plurality of battery cells that are stacked, heat energy generated by thermal runaway induced in an adjacent battery cell increases rapidly and becomes a cause of impairing safety. To prevent this adverse effect, battery systems each having a safety mechanism that interrupts a current path in the event of an abnormality have been developed. As such a safety mechanism, a current interrupt device (hereinafter referred to as "CID") that interrupts a current path at the time of a rise in an internal pressure of a battery cell and the like are known. (See PTL 1)

CITATION LIST

Patent Literature

PTL 1: Unexamined Japanese Patent Publication No. 2010-157451

SUMMARY OF THE INVENTION

A CID is disposed inside a battery cell and between an internal electrode and an electrode terminal. This CID is normally in an on-state and electrically connects the internal electrode and the electrode terminal, but when the internal pressure of the battery cell exceeds a predetermined value that has been designed in advance, the CID is switched to an off-state and interrupts the connection between the internal electrode and the electrode terminal. Thus, for example, when an abnormality such as an internal short circuit occurs in a certain battery cell, the internal pressure of the battery cell rises so that the CID can operate to separate the abnormal battery cell from a current path. However, if the internal temperature becomes abnormally high, an insulating material of the CID or the like may melt, causing the CID to fail to maintain the normal operation that interrupts a current. Specifically, in a battery system where adjacent battery cells are connected in parallel, if a CID of an internally short-circuited battery cell fails to maintain the normal operation, current is to flow from a battery cell connected in parallel to the internally short-circuited battery cell into the internally short-circuited battery cell. In such a case, it is not possible to suppress a temperature rise of the battery due to the inflow current, and thus the internally short-circuited battery cell may serve as a trigger cell to cause heat propagation to the adjacent battery cell and induce thermal runaway under which the adjacent battery cell generates abnormal heat.

The present invention has been developed for preventing the above-mentioned adverse effect. An object of the present invention is to provide technology that can reliably prevent induction of thermal runaway and ensure high safety in a battery system including a plurality of battery cells connected in parallel, by interrupting electrical connection between a battery cell in an abnormal state and a battery cell connected in parallel to the abnormal battery cell and interrupting an inflow current from the battery cell connected in parallel.

A method for interrupting an inflow current of a battery system according to an aspect of the present invention, the battery system including a plurality of prismatic battery cells each having a sealing plate provided with electrode terminals that are positive and negative, at least one of the electrode terminals being fixed to the sealing plate in an insulated state, parallel-connected bus bars each connecting the plurality of prismatic battery cells in parallel, and a safety mechanism configured to be capable of interrupting a current path of the prismatic battery cells connected in parallel by the parallel-connected bus bars, includes the sealing plate of one of the prismatic battery cells convexly deforming due to a rise in an internal pressure of the prismatic battery cell when an abnormality occurs, bringing the sealing plate that has convexly deformed into contact with the parallel-connected bus bars to form external short circuitry between the electrode terminals that are positive and negative of a prismatic battery cell connected in parallel to the prismatic battery cell with the abnormality, and the external short circuitry activating the safety mechanism that interrupts a current flowing into the prismatic battery cell with the abnormality.

A battery system according to an aspect of the present invention includes a battery block having a plurality of prismatic battery cells that are stacked and each have a sealing plate provided with electrode terminals that are positive and negative, parallel-connected bus bars each connected to the electrode terminals of the prismatic battery cells and connecting some or all of the prismatic battery cells in parallel, and a safety mechanism configured to be capable of interrupting a current path of the prismatic battery cells connected in parallel by the parallel-connected bus bars. The sealing plate of each of the prismatic battery cells is a metal sheet configured to be deformed into a convex shape by a rise in an internal pressure due to an abnormality such as an internal short circuit of the prismatic battery cell, and the prismatic battery cells each include a top cover disposed at a fixed position being a position facing a side opposite to surfaces of the parallel-connected bus bars, the surfaces facing the sealing plate. The parallel-connected bus bars are disposed between the top cover and the sealing plate, and the sealing plate, the parallel-connected bus bars, and the top cover are disposed at positions that cause, in a state where the sealing plate has deformed into a convex shape, the top cover to press the parallel-connected bus bars against the sealing plate in the convex shape, and the parallel-connected bus bars to be short-circuited via the sealing plate.

Further, an electric vehicle including the battery system provided with the configuration elements of the aspects described above includes the battery system, a motor for running configured to be supplied with electric power from the battery system, a vehicle body equipped with the battery system and the motor, and wheels configured to be driven by the motor and run the vehicle body.

Furthermore, a power storage device including the battery system provided with the configuration elements of the aspects described above includes the battery system, and a power supply controller configured to control charging and discharging of the battery system. The power supply controller has control of enabling the prismatic battery cells to be charged with electric power from an outside and charging the prismatic battery cells.

A method for interrupting an inflow current of a battery system and the battery system according to the present invention ensure high safety by reliably preventing induction of thermal runaway of a parallel battery connected in parallel to a prismatic battery cell (trigger cell) under thermal runaway due to an abnormality such as an internal short circuit. This is because the prismatic battery cell (trigger cell) whose internal pressure has risen due to an abnormality such as an internal short circuit has a sealing plate that convexly deforms due to the rise in the internal pressure, the convexly deformed sealing plate short-circuits positive and negative parallel-connected bus bars connected to electrode terminals fixed to this sealing plate, the short-circuited parallel-connected bus bars make the short circuit resistance of the trigger prismatic battery cell small, and the parallel battery connected in parallel to this trigger prismatic battery cell draws an inflow current to activate a safety mechanism that interrupts the inflow current of the parallel battery.

DESCRIPTION OF EMBODIMENTS

Figure 1:
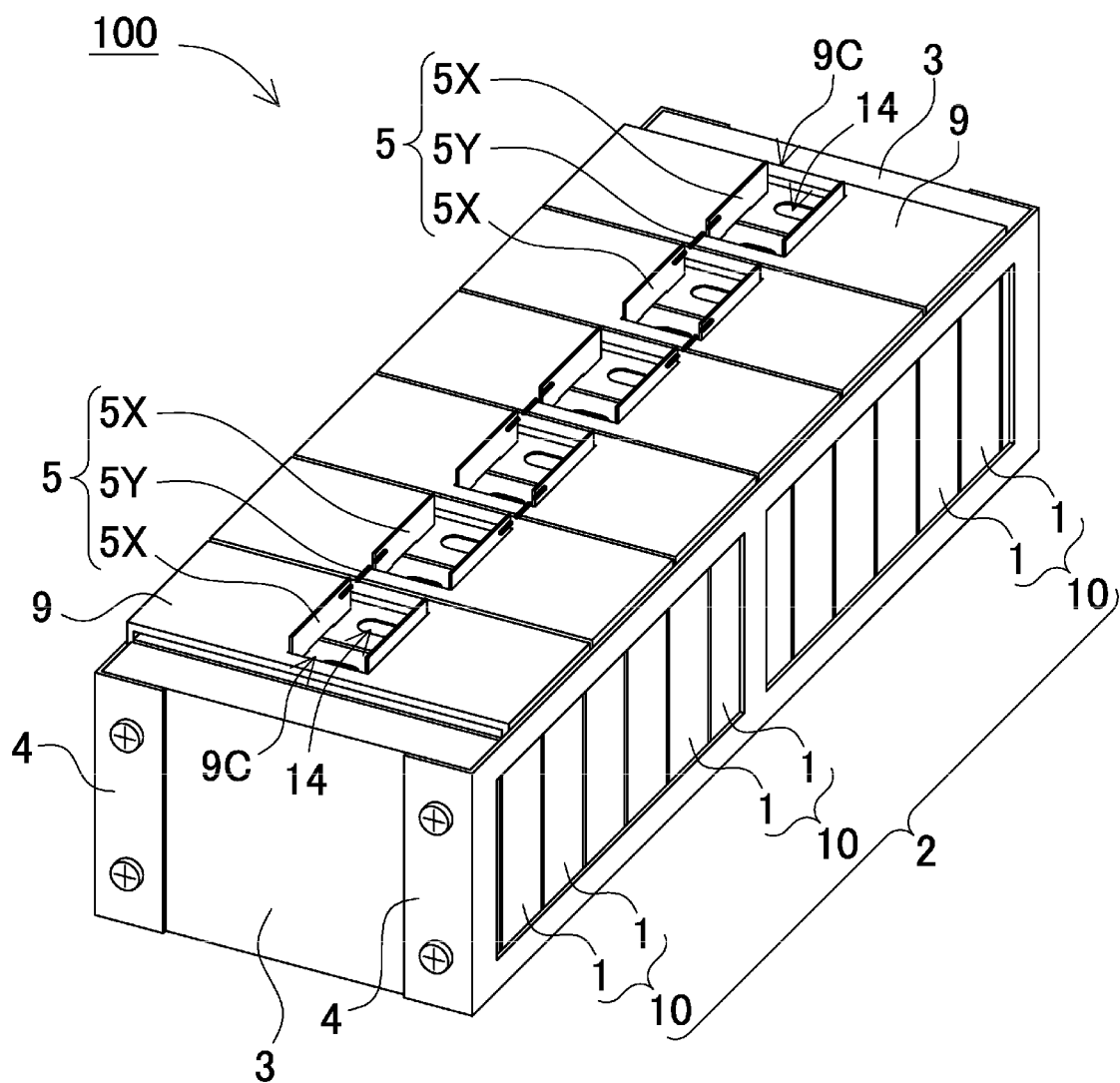
FIG. 1 is a perspective view of a battery system according to an exemplary embodiment of the present invention.

First, one focus of the present invention will be described. A battery system including a plurality of battery cells that are stacked outputs larger current by adjacent secondary batteries connected in parallel. In this battery system, if one of the battery cells abnormally generates heat due to an internal short circuit or the like, a battery cell connected in parallel to the internally short-circuited battery cell (trigger battery) may be externally short-circuited by the trigger battery cell and draw an excessive short circuit current (referred to as inflow current), causing thermal runaway. An internal resistance of the battery cell that has abnormally generated heat due to an internal short circuit or the like and an internal resistance of the battery cell connected in parallel to this trigger battery cell may be extremely small, so that an inflow current of the battery cell connected in parallel to the trigger battery cell also becomes extremely large, causing induction of thermal runaway. Induction of thermal runaway of the parallel-connected battery cell results in generating an extremely large amount of heat energy, causing impairment of safety.

A fuse coupled to each battery cell is capable of current interruption when an excessive current flows. However, a battery system in which a load current significantly varies becomes unable to supply electric power to the load when the fuse blows at a peak value of the load current. Thus, it is practically extremely difficult to set a fusing current of the fuse such that the fuse surely blows at an excessive current due to an internal short circuit or the like, and remains at the peak value of the load current. When the fusing current is set such that the fuse surely blows at an excessive current during abnormality, the fuse sometimes blows at a peak current of the load flowing instantaneously. On the contrary, when the fusing current is set such that the fuse remains at a peak current of the load, the fuse sometimes fails to blow at an excessive current during abnormality. Further, in a battery system having fuses connected in series to respective battery cells, electrical resistances of the fuses consume electric power uneconomically, and the power loss due to the fuses is thus unable to be ignored, resulting also in an adverse effect that electric power is used less efficiently.

As described above, in a battery system including a plurality of battery cells connected in parallel, it is important to reliably prevent induction of thermal runaway of the plurality of battery cells by, when one of the battery cells undergoes thermal runaway, immediately interrupting connection to a battery cell connected in parallel to this trigger battery cell. Particularly, it is important to study a method and a configuration that can promptly detect an abnormality in a battery cell and reliably prevent an inflow current to ensure high safety A method for interrupting an inflow current of a battery system according to an aspect of the present invention may be specified by the following method. The method for interrupting an inflow current is a method for interrupting an inflow current of a battery system, the battery system including battery block 2 having a plurality of prismatic battery cells 1 that are stacked and each have sealing plate 12 provided with electrode terminals 13 that are positive and negative, parallel-connected bus bars 5X each connected to electrode terminals 13 of prismatic battery cells 1 and connecting some or all of prismatic battery cells 1 in parallel, and safety mechanism 6 configured to be capable of interrupting a current path of prismatic battery cells 1 connected in parallel by parallel-connected bus bars 5X. Sealing plate 12 of prismatic battery cell 1 is a metal sheet configured to be deformed into a convex shape by a rise in an internal pressure due to a temperature rise of prismatic battery cell 1, at least one of electrode terminals 13 is fixed to sealing plate 12 in an insulated state, top cover 9 is disposed at a fixed position facing and apart from sealing plate 12, and parallel-connected bus bars 5X are disposed between top cover 9 and sealing plate 12. When one of prismatic battery cells 1 undergoes thermal runaway due to an internal short circuit or the like and the internal pressure rises, sealing plate 12 of the battery under thermal runway due to an internal short circuit or the like (referred to as trigger battery) deforms into a convex shape, and sealing plate 12 in the convex shape pushes out parallel-connected bus bars 5X. Pushed out parallel-connected bus bars 5X are pressed against a surface of sealing plate 12 by top cover 9 at the fixed position, externally short-circuited via sealing plate 12, and constitute external short circuitry 15 of a parallel battery connected in parallel to the trigger battery. This external short circuitry 15 flows an inflow current through the parallel battery to activate safety mechanism 6 that interrupts the current.

According to the above method, a metal sheet that is deformed by a rise in an internal pressure due to an abnormality such as an internal short circuit is used for the sealing plate of the prismatic battery cell. When the internal pressure rises due to an abnormality such as an internal short circuit, the sealing plate is convexly deformed, and brought into contact with the parallel-connected bus bars fixed to the electrode terminals to short-circuit the positive and negative parallel-connected bus bars via the sealing plate. When the positive and negative parallel-connected bus bars are short-circuited via the sealing plate, a short circuit resistance becomes significantly small. When the short circuit resistance of the internally short-circuited trigger battery becomes small, a short circuit resistance of the external short circuitry of the battery connected in parallel to this battery becomes small, and the inflow current of the parallel battery significantly increases. This inflow current activates the safety mechanism that interrupts the current. In the above state, the inflow current of the parallel battery is interrupted. That is, an inflow current of the parallel battery is interrupted in response to detection of deformation of the sealing plate, which allows an inflow current of the parallel battery to be surely interrupted without having to connect an element that interrupts a current in series to the battery like a fuse and consuming uneconomical electric power like a fuse. Further, an internal pressure of an internally short-circuited battery rises due to an excessive current. Therefore, interrupting an inflow current by deformation of the sealing plate due to this rise in the internal pressure achieves a feature of surely interrupting an inflow current of the parallel battery.

In the method for interrupting an inflow current of the battery system, safety mechanism 6 may be CID 9 built in prismatic battery cell 1. According to the above method, the CID built in the prismatic battery cell works as the safety mechanism to interrupt a current, so that the structure can be simplified and manufacturing cost can be reduced without using a dedicated safety mechanism.

Further, in the method for interrupting an inflow current of the battery system, safety mechanism 6 may be fuse part 7 provided in parallel-connected bus bars 5X. According to the above method, the fuse part provided in the parallel-connected bus bars can surely interrupt an inflow current of the parallel battery with a simple structure. Particularly, in this method, the sealing plate short-circuits the parallel-connected bus bars to flow an excessive current through the parallel-connected bus bars, causing the fuse part to blow. Therefore, the short circuitry constituted by the parallel-connected bus bars and the sealing plate short-circuits the parallel battery so that an extremely large inflow current flows through the parallel-connected bus bars, allowing the fuse part to instantaneously blow for sure and the inflow current to be interrupted, unlike a conventional case where a current is interrupted by a fuse connected in series to a battery cell.

Furthermore, in the method for interrupting an inflow current of the battery system, a pair of electrode terminals 13 may be fixed to sealing plate 12 in an insulated state.

A battery system according to an aspect of the present invention includes battery block 2 having a plurality of prismatic battery cells 1 that are stacked and each have sealing plate 12 provided with electrode terminals 13 that are positive and negative, parallel-connected bus bars 5X each connected to electrode terminals 13 of prismatic battery cells 1 and connecting some or all of prismatic battery cells 1 in parallel, and safety mechanism 6 configured to be capable of interrupting a current path of prismatic battery cells 1 connected in parallel by parallel-connected bus bars 5X. Sealing plate 12 of prismatic battery cell 1 is a metal sheet configured to be deformed into a convex shape by a rise in an internal pressure of prismatic battery cell 1, and prismatic battery cell 1 includes top cover 9 disposed at a fixed position being a position facing a side opposite to surfaces of parallel-connected bus bars 5X, the surfaces facing sealing plate 12. Parallel-connected bus bars 5X are disposed between top cover 9 and sealing plate 12, and sealing plate 12, parallel-connected bus bars 5X, and top cover 9 are disposed at positions that cause, in a state where sealing plate 12 has deformed into a convex shape, top cover 9 to press parallel-connected bus bars 5X against sealing plate 12 in the convex shape, and parallel-connected bus bars 5X to be short-circuited via sealing plate 12.

According to the above configuration, a metal sheet that is deformed by a rise in an internal pressure due to a temperature rise caused by an internal short circuit or the like is used for the sealing plate of the prismatic battery cell. In a state where the sealing plate has deformed into a convex shape due to a rise in the internal pressure, the top cover presses the parallel-connected bus bars against the sealing plate in the convex shape, causing the positive and negative parallel-connected bus bars to be short-circuited via the sealing plate. When the positive and negative parallel-connected bus bars are short-circuited via the sealing plate, a short circuit resistance becomes significantly small. When the short circuit resistance of the internally short-circuited trigger battery becomes small, a short circuit resistance of the battery connected in parallel to this battery becomes small, and the inflow current of the parallel battery significantly increases. In the parallel battery of which inflow current has increased, this inflow current activates the safety mechanism that interrupts the current. In the above state, the inflow current of the parallel battery is interrupted. That is, an inflow current of the parallel battery is interrupted in response to detection of deformation of the sealing plate, which allows an inflow current of the parallel battery to be surely interrupted without having to connect an element that interrupts a current in series to the battery like a fuse and consuming uneconomical electric power like a fuse. Further, an internal pressure of a trigger battery rises due to an excessive current or the like. Therefore, interrupting an inflow current by deformation of the sealing plate due to this rise in the internal pressure achieves a feature of surely interrupting an inflow current of the parallel battery.

In the battery system, safety mechanism 6 may be CID 8 built in prismatic battery cell 1. According to the above configuration, the CID built in the prismatic battery cell works as the safety mechanism to interrupt a current, so that the structure can be simplified and manufacturing cost can be reduced without using a dedicated safety mechanism.

Further, in the battery system, safety mechanism 6 may be fuse part 7 provided in parallel-connected bus bars 5X. According to the above configuration, the fuse part provided in the parallel-connected bus bars can surely interrupt an inflow current of the parallel battery with a simple structure. Particularly, in this structure, the sealing plate short-circuits the parallel-connected bus bars to flow an excessive current through the parallel-connected bus bars, causing the fuse part to blow. Therefore, the short circuitry constituted by the parallel-connected bus bars and the sealing plate short-circuits the parallel battery so that an extremely large inflow current flows through the parallel-connected bus bars, allowing the fuse part to instantaneously blow for sure and the inflow current to be interrupted, unlike a conventional structure where a current is interrupted by a fuse connected in series to a battery cell.

The battery system may include insulation layer 18 between sealing plate 12 and parallel-connected bus bars 5X. Insulation layer 18 is preferably fusible insulation layer 18A to be fused by heat generated by an internal short circuit.

Further, in the battery system, prismatic battery cell 1 may include gas valve 14 configured to discharge gas when an internal pressure rises, and insulation layer 18 may be disposed at a position covering gas valve 14 of prismatic battery cell 1. Furthermore, insulation layer 18 may be disposed at a position that causes insulation layer 18 to break when insulation layer 18 is sandwiched between sealing plate 12 that has deformed and parallel-connected bus bars 5X.

Further, in the battery system, a pair of electrode terminals 13 may be fixed to sealing plate 12 in an insulated state.

Hereinafter, exemplary embodiments of the present invention will be described with reference to the drawings. Note that, the exemplary embodiments described below show methods and configurations for embodying technical ideas of the present invention as examples, and the present invention is not limited to the following methods and things. Further, members shown in the claims are not limited to members of the exemplary embodiments. Particularly, dimensions, material, shapes, relative positions of constituent members and the like described in the exemplary embodiments are not intended to limit the scope of the present invention thereto, unless otherwise specifically described, and are just explanation examples. Sizes and positional relationships of members and the like shown in the drawings are sometimes exaggerated for clarity of explanation. In the following description, identical names and reference marks indicate identical or similar members, and their detailed description will be appropriately omitted. As for elements constituting the present invention, a plurality of elements may be configured as an identical member and the single member may serve as each of the plurality of elements, or conversely, functionality of one member may be shared with and achieved by a plurality of members. Contents described in some of examples and exemplary embodiments may be applicable to other examples and exemplary embodiments.

Hereinafter, description will be made based on an example optimal for a vehicle battery system as an exemplary embodiment of the battery system. Battery system 100 shown in an overall perspective view of FIG. 1 includes battery block 2 having a plurality of prismatic battery cells 1 that are stacked, and bus bars 5 that are connected to electrode terminals 13 of respective prismatic battery cells 1 constituting battery block 2 and connect prismatic battery cells 1 in parallel and in series. In battery system 100 in FIG. 1, prismatic battery cells 1 are connected in parallel and in series. Bus bar 5 includes parallel-connected bus bars 5X to connect prismatic battery cells 1 in parallel, and series-connected bus bar 5Y to connect prismatic battery cells 1 in series. Battery system 100 still includes safety mechanism 6 configured to be capable of interrupting a current path of prismatic battery cells 1 connected in parallel by parallel-connected bus bars 5X. Battery system 100 described above can output larger current by prismatic battery cells 1 connected in parallel, and output higher voltage by prismatic battery cells 1 connected in series. Accordingly, in battery system 100, prismatic battery cells 1 are connected in parallel and in series to output optimal current and voltage for its application.

Battery block 2 has the plurality of prismatic battery cells 1 that are stacked with an insulating separator (not shown) in between. Battery block 2 has a pair of end plates 3 disposed on both end surfaces of the plurality of prismatic battery cells 1 that are stacked, and end plates 3 are coupled by bind bars 4 to fix the plurality of prismatic battery cells 1 in a pressurized state.

Prismatic battery cell 1 is a non-aqueous electrolyte secondary battery such as a lithium ion secondary battery. Battery system 100 using lithium ion secondary batteries as prismatic battery cells 1 is able to have larger charge and discharge capacity with respect to volume and weight. However, any other secondary battery with small internal resistance, high capacity, and high output may be used as prismatic battery cell 1 instead of a lithium ion secondary battery.

Figure 2:
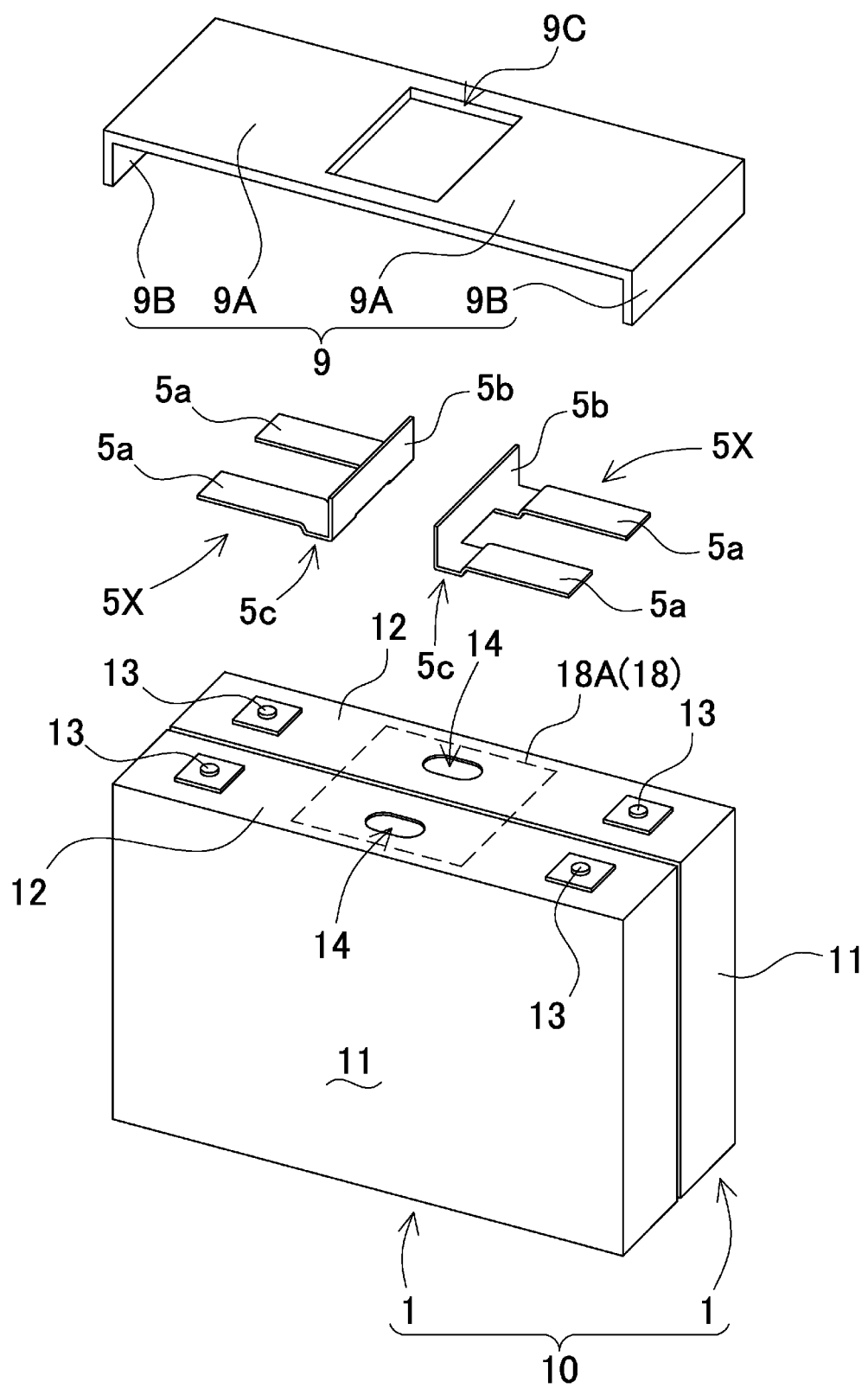
FIG. 2 is an exploded perspective view of a parallel battery unit of the battery system shown in FIG. 1.

As shown in the exploded perspective view of FIG. 2, prismatic battery cell 1 includes metal exterior can 11 having a thickness smaller than a width of its upper side and an opening sealed by sealing plate 12. Exterior can 11 is made by forming a metal sheet into a thick rectangular shape by an additional drawing process. Exterior can 11 and sealing plate 12 are made of a metal sheet such as aluminum or an aluminum alloy. Further, sealing plate 12 hermetically seals the upper opening of exterior can 11 via an insulating material (not shown). Sealing plate 12 has positive and negative electrode terminals 13 fixed to both ends of sealing plate 12 via the insulating material (not shown). Sealing plate 12 still has gas valve 14 between electrode terminals 13. Gas valve 14 opens when an internal pressure of exterior can 11 rises to or above a predetermined value to release gas inside and prevent exterior can 11 from bursting.

Sealing plate 12 is a metal sheet that deforms when prismatic battery cell 1 exhibits a rise in the internal pressure. Sealing plate 12 may be a metal sheet such as aluminum (in the present specification, the term aluminum also means an aluminum alloy). Metal sealing plate 12 is made of such a material with a thickness that deformation occurs when the internal pressure rises. For example, sealing plate 12 made of an aluminum alloy having a thickness of 0.5 mm to 2.0 mm, preferably 1.0 mm to 1.5 mm, deforms when the internal pressure rises.

Prismatic battery cell 1 is provided with gas valve 14 that opens to be able to prevent exterior can 11 from bursting when the internal pressure abnormally rises. Prismatic battery cell 1 in FIG. 2 is provided with gas valve 14 at a center of sealing plate 12. Gas valve 14 opens to discharge gas inside at a set pressure. The pressure at which gas valve 14 opens is set such that gas valve 14 opens after CID 8B of a parallel battery, which will be described later, operates to interrupt an inflow current. In the present specification, the term parallel battery means, with respect to an arbitrary prismatic battery cell, a prismatic battery cell connected in parallel to this prismatic battery cell.

Figure 3:
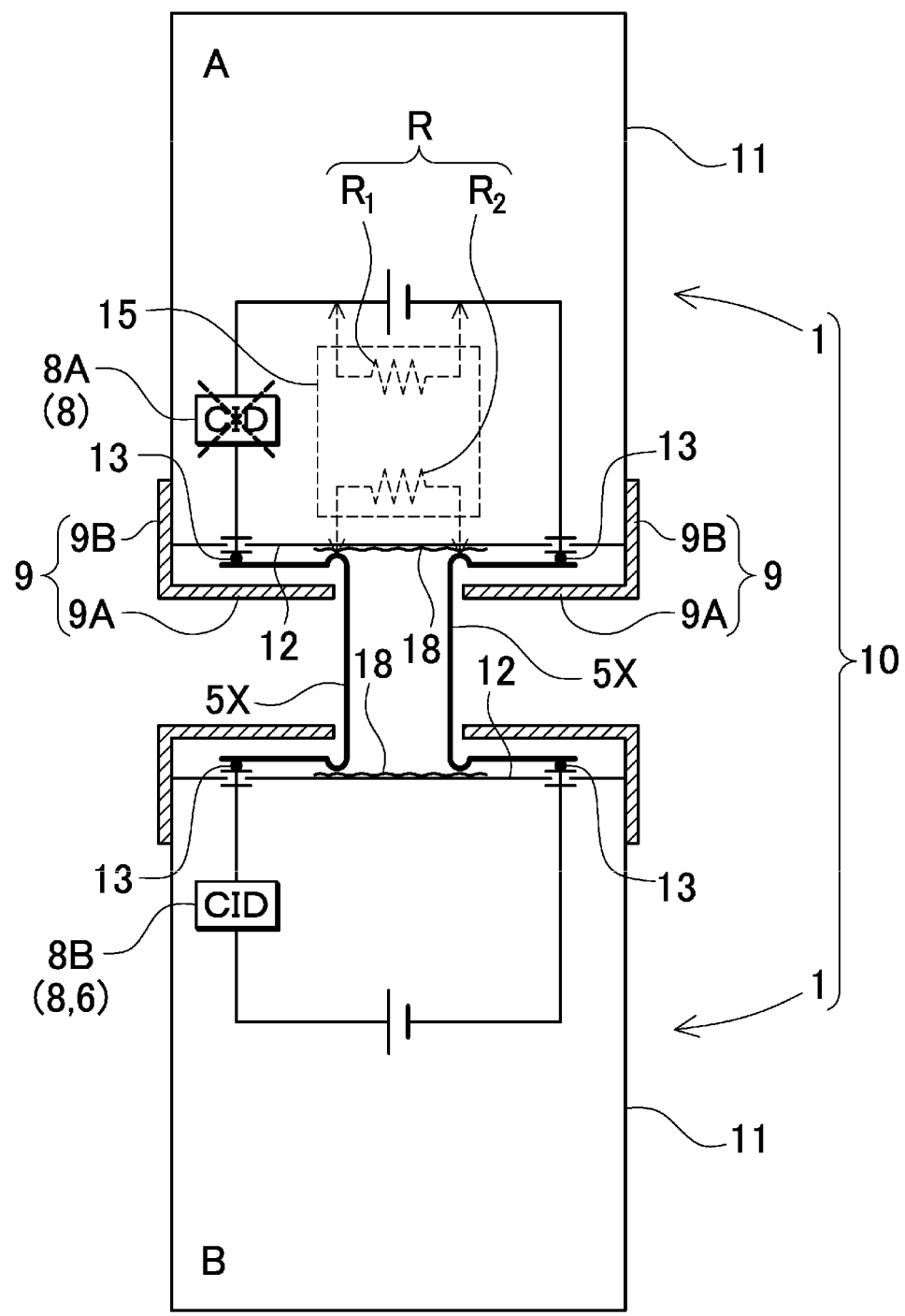
FIG. 3 is a schematic configuration diagram showing a connected state of prismatic battery cells connected in parallel.

When one of prismatic battery cells 1 is internally short-circuited, the battery system activates safety mechanism 6 configured to be capable of interrupting a current path of prismatic battery cell 1 (hereinafter, simply referred to as battery) connected in parallel, to interrupt a current of the parallel battery. Prismatic battery cell 1 shown in FIG. 3 includes built-in CID 8 as safety mechanism 6 that interrupts a current path, and CID 8 interrupts a current when a large current flows. The schematic configuration diagram of FIG. 3 is a diagram showing a connected state of batteries that are connected adjacently in parallel. In this figure, the adjacent batteries that are in actuality stacked and arrayed are positioned to face each other for easier understanding of a state where an internal short circuit causes an overcurrent. This figure shows that, when prismatic battery cell 1 located on the upper side (hereinafter referred to as battery A) is internally short-circuited, as shown by the chain line, an inflow current flows through prismatic battery cell 1 on the lower side (hereinafter referred to as battery B) that is a parallel battery connected in parallel to this battery A. This is because battery A having an internal short circuit serves as external short circuitry 15 of battery B as the parallel battery. When an excessive current flows to accelerate thermal runaway due to the internal short circuit of one of the batteries, and an adjacent battery further undergoes thermal runaway due to an excessive current caused by an external short circuit or the like, thermal runaway is induced in a plurality of the batteries, resulting in extremely large heat energy generated in a short time. In order to prevent the above adverse effects, the battery system activates CID 8B of battery B as the parallel battery when battery A is internally short-circuited, to interrupt an excessive current flowing through battery B and prevent induction of thermal runaway.

FIG. 3 shows that, internal short circuit of battery A places battery A in a state where internal short circuit resistance R1 is connected to positive and negative electrode terminals 13. Internal short circuit resistance R1 is connected in parallel to positive and negative electrode terminals 13 of battery B, and externally short-circuits battery B to flow an inflow current. At this time, the inflow current flowing through battery B varies with a resistance value of internal short circuit resistance R1. In battery A having the internal short circuit, the internal pressure rises due to the inflow current to deform sealing plate 12. Sealing plate 12 that has deformed short-circuits positive and negative bus bars 5. In this state, an electrical resistance between positive and negative bus bars 5, that is, forced short circuit resistance R2 between bus bars 5 is extremely small. Forced short circuit resistance R2 is connected to battery B to flow a large inflow current through battery B, and surely activates built-in CID 8B that interrupts the current.

The battery system described above activates built-in CID 8B of battery B with the internal short circuit of battery A, to interrupt an inflow current of battery B and prevent thermal runaway of battery B. This battery system surely interrupts a current of battery B regardless of the resistance value of internal short circuit resistance R1 of battery B. If internal short circuit resistance R1 of battery A having the internal short circuit can surely activate built-in CID 8B of battery B, it is not necessary to short-circuit positive and negative bus bars 5 via sealing plate 12. The resistance value of internal short circuit resistance R1 of the battery varies and is not constant in the internally short-circuited state. If internal short circuit resistance R1 flows a current with such a current value that battery A having the internal short circuit undergoes thermal runaway and built-in CID 8B of battery B fails to operate, an inflow current of battery B cannot be interrupted. Battery B of which CID 8B fails to interrupt an inflow current may undergo thermal runaway due to the inflow current.

When the battery system is in a state where one of the batteries is internally short-circuited, to surely activate CID 8B of a parallel battery connected in parallel to this battery, and to surely activate CID 8B of battery B, the internal short circuit of battery A that has internally short-circuited causes positive and negative parallel-connected bus bars 5X to come into contact with sealing plate 12 and thus forced short circuit resistance R2 to connect in parallel to internal short circuit resistance R1. The parallel connection between internal short circuit resistance R1 and forced short circuit resistance R2 results in external connection resistance R with a smaller resistance value, which is connected in parallel to positive and negative electrode terminals 13 of battery B. Forced short circuit resistance R2 is an electrical resistance between parallel-connected bus bars 5X, with positive and negative parallel-connected bus bars 5X made of a metal sheet in contact with sealing plate 12 made of a metal sheet, the metal sheet having a small electrical resistance. Forced short circuit resistance R2 is thus extremely small. Forced short circuit resistance R2 serves as external short circuitry 15 of battery B, flows a large inflow current through battery B, and reliably activates built-in CID 8B that interrupts the current.

In order to activate CID 8B of the parallel battery with an inflow current and interrupt the current, prismatic battery cell 1 has sealing plate 12 that is a metal sheet to be deformed into a convex shape by a rise in the internal pressure due to an internal short circuit of the battery, and built-in CID 8B inside. Prismatic battery cell 1 that has internally short-circuited also includes CID 8A, which is unable to interrupt a current since insulation has been broken by an abnormal temperature rise. In prismatic battery cell 1 connected in parallel to prismatic battery cell 1 whose internal pressure has risen due to an internal short circuit or the like, CID 8B is normally activated with an excessive inflow current to interrupt the current. The reason is that prismatic battery cell 1 connected in parallel to prismatic battery cell 1 itself has no internal short circuit and is thus in a normal state inside, allowing for normally activating CID 8B with an excessive inflow current due to an external short circuit and interrupting the current.

Figure 4:
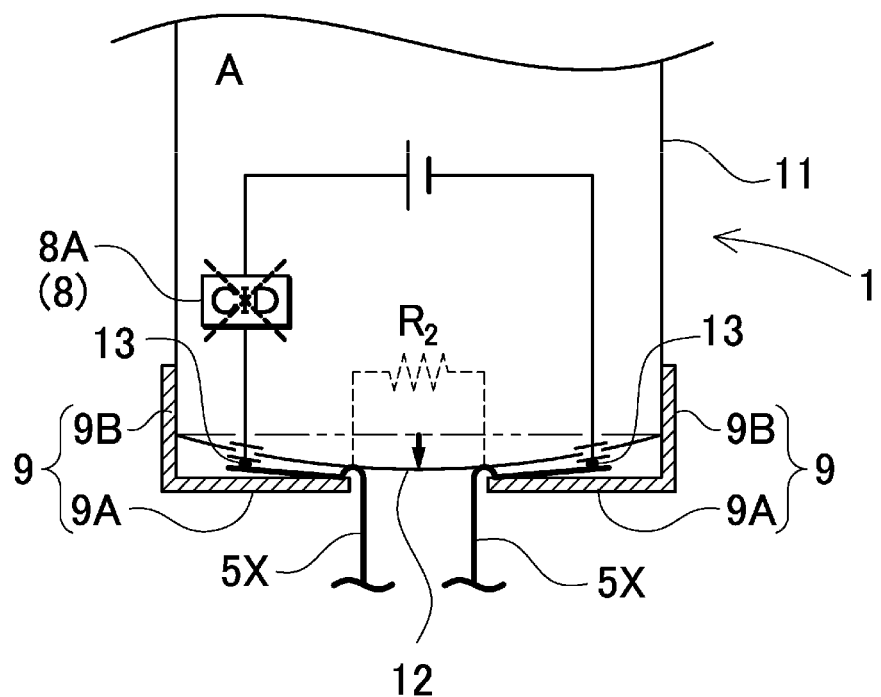
FIG. 4 is a schematic view showing an internally short-circuited prismatic battery cell (trigger battery).

CID 8 is inside sealed exterior can 11 and connected between electrode terminal 13 and an electrode plate (not shown). When a large inflow current flows and the internal pressure of sealed exterior can 11 rises, CID 8 operates to interrupt the current. In order for the inflow current to reliably activate CID 8B built in battery B connected in parallel to battery A having the internal short circuit, positive and negative parallel-connected bus bars 5X are disposed at positions facing sealing plate 12. Further, in order to press positive and negative parallel-connected bus bars 5X against a surface of sealing plate 12 that has deformed into a convex shape, top cover 9 is disposed at a fixed position facing sealing plate 12, and parallel-connected bus bars 5X are disposed between top cover 9 and sealing plate 12. In this prismatic battery cell 1, sealing plate 12, parallel-connected bus bars 5X, and top cover 9 are disposed at positions that cause, as shown in a partially enlarged view of FIG. 4, in a state where sealing plate 12 has deformed into a convex shape, top cover 9 to press parallel-connected bus bars 5X against sealing plate 12 in the convex shape, and positive and negative parallel-connected bus bars 5X to be short-circuited via sealing plate 12.

FIG. 3 shows that parallel-connected bus bars 5X have no contact with sealing plate 12 in a normal state where battery A is not internally short-circuited. Thus, parallel-connected bus bars 5X are disposed at positions facing and apart from sealing plate 12. Each prismatic battery cell 1 in FIG. 3 is provided with insulation layer 18 between parallel-connected bus bars 5X and sealing plate 12 for reliably insulating parallel-connected bus bars 5X from sealing plate 12 in a normal use state, in other words, in a state where there is no internal short circuit. Insulation layer 18 is disposed at a position that causes insulation layer 18 to break when insulation layer 18 is sandwiched between sealing plate 12 that has deformed and parallel-connected bus bars 5X. This insulation layer 18 is fusible insulation layer 18A that is fused by heat generated by an internal short circuit or the like. Fusible insulation layer 18A is fused by heat of battery A that has internally short-circuited, bringing parallel-connected bus bars 5X into contact with sealing plate 12. This fusible insulation layer 18A is made of thermoplastic resin that is fused by heat generated by an internal short circuit of the battery or the like. Fusible insulation layer 18A shown in FIG. 2 is disposed at a position covering gas valve 14 of prismatic battery cell 1. Fusible insulation layer 18A disposed at this position is surely fused and removed by gas discharged from gas valve 14 that opens when the battery is abnormal. Accordingly, when gas valve 14 opens, it is possible to surely bring parallel-connected bus bars 5X into contact with sealing plate 12 and interrupt an inflow current of the parallel battery. As described above, prismatic battery cell 1 provided with fusible insulation layer 18A is able to, while preventing the adverse effect of parallel-connected bus bars 5X coming into contact with sealing plate 12 in a normal state where there is no internal short circuit, surely bring parallel-connected bus bars 5X into contact with sealing plate 12 by fusing of fusible insulation layer 18A during abnormal heat generation due to a short circuit or the like. However, insulation layer 18 does not necessarily have to be included, and parallel-connected bus bars 5X may be disposed apart from sealing plate 12 in a state where there is no internal short circuit or the like.

Top cover 9 is disposed to surely bring parallel-connected bus bars 5X into contact with sealing plate 12 in a state where sealing plate 12 has deformed into a convex shape. Top cover 9 shown in FIGS. 2 and 3 is an L-shaped insulating plate of which pressing part 9A and fixed part 9B are coupled at a right angle. One end of fixed part 9B is fixed to an outer peripheral surface of exterior can 11 and pressing part 9A is disposed at a position facing parallel-connected bus bar 5X. Pressing part 9A is disposed at a fixed position via fixed part 9B and thus does not shift even when sealing plate 12 has deformed into a convex shape, causing parallel-connected bus bar 5X pushed out by sealing plate 12 that has deformed into the convex shape to be pressed against sealing plate 12 by pressing part 9A.

Parallel-connected bus bar 5X shown in FIG. 2 includes a pair of connecting parts 5a facing and connected to electrode terminals 13 of prismatic battery cells 1 adjacent to each other, and coupling part 5b coupling the pair of connecting parts 5a. This parallel-connected bus bar 5X is formed into a U-shape as a whole with the pair of connecting parts 5a disposed in parallel to each other and coupled at one end via coupling part 5b. Each connecting part 5a has a flat plate shape extending in a longitudinal direction of sealing plate 12, and is disposed in a parallel posture with respect to sealing plate 12. Coupling part 5b is coupled to the pair of connecting parts 5a to intersect connecting parts 5a, and is bent in an upright posture with respect to sealing plate 12.

This parallel-connected bus bar 5X has tip portions of the pair of connecting parts 5a electrically connected to respective electrode terminals 13 adjacent to each other, with coupling part 5b disposed at a center of sealing plate 12 near gas valve 14. Parallel-connected bus bar 5X shown in FIG. 2 is still provided with protrusions 5c formed by processing boundary portions between connecting parts 5a and coupling part 5b into a shape protruding toward sealing plate 12. In this parallel-connected bus bar 5X, protrusions 5c provided at the boundary portions between connecting parts 5a and coupling part 5b are protruding toward sealing plate 12 while connecting parts 5a are disposed in a parallel posture with respect to sealing plate 12. Thus, when parallel-connected bus bars 5X are pressed by sealing plate 12 that has deformed into a convex shape, these protrusions 5c come into contact with sealing plate 12, which short-circuits parallel-connected bus bars 5X.

Figure 5:
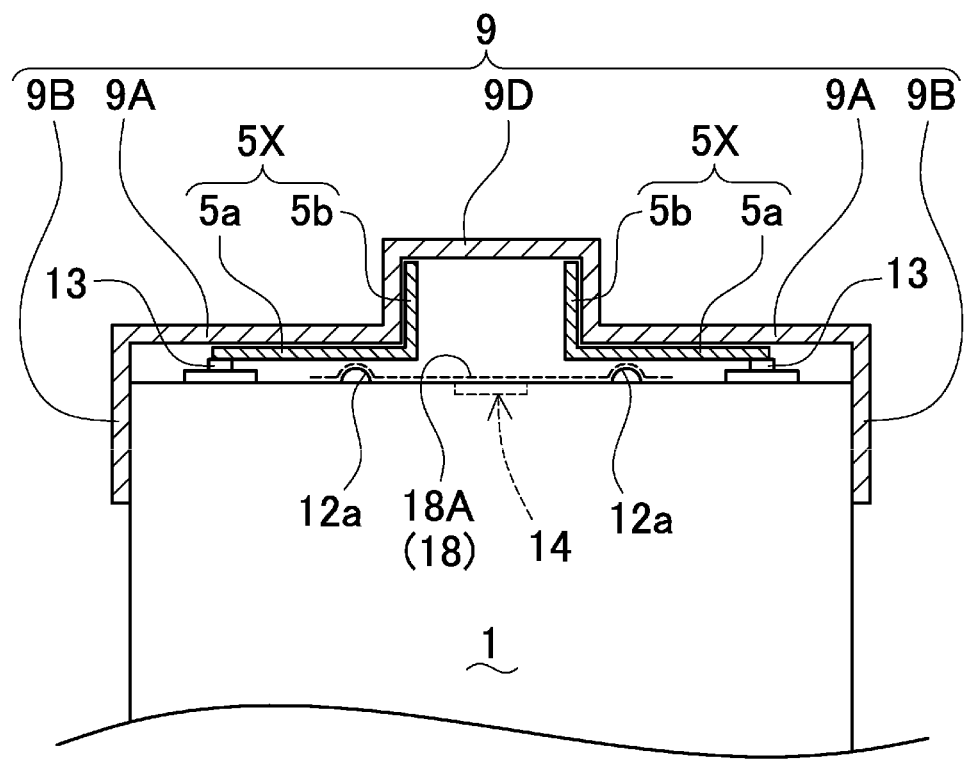
FIG. 5 is a cross-sectional view showing another example of a prismatic battery cell and a top cover.

Parallel-connected bus bars 5X having the above-described shape are provided with protrusions 5c protruding toward sealing plate 12 in connecting parts 5a, and are short-circuited via sealing plate 12 by bring these protrusions 5a into contact with sealing plate 12 that has deformed into a convex shape. However, the battery system, as shown in FIG. 5, may include connecting parts 5a having a flat plate shape and include sealing plate 12 having protrusions 12a. Also in this structure, in a state where sealing plate 12 has deformed into a convex shape, protrusions 12a protruding from sealing plate 12 come into contact with connecting parts 5a of parallel-connected bus bars 5X to short-circuit parallel-connected bus bars 5X via sealing plate 12.

Top cover 9 shown in FIG. 2 is provided with opening 9C at a middle of pressing parts 9A for guiding coupling parts 5b of parallel-connected bus bars 5X disposed in an upright posture with respect to sealing plate 12. Prismatic battery cells 1 connected in parallel to each other via parallel-connected bus bars 5X constitute parallel battery unit 10, and parallel battery units 10 adjacent to each other have respective coupling parts 5b that are protruding from openings 9C and coupled via series-connected bus bar 5Y. Top cover 9 of this structure allows for simply connecting parallel-connected bus bars 5X exposed from openings 9C to connect a plurality of parallel battery units 10 in series. As shown in FIG. 5, top cover 9 may be provided with covering part 9D that covers upper ends of coupling parts 5b disposed in an upright posture above parallel-connected bus bars 5X. Top case 9 of this structure presses connecting parts 5a of parallel-connected bus bars 5X with pressing parts 9A and coupling parts 5b with covering part 9D, so that parallel-connected bus bars 5X pushed out by sealing plate 12 that has convexly deformed can be more surely pressed against sealing plate 12.

The above battery system uses, as safety mechanism 6, CID 8B provided in prismatic battery cell 1 connected in parallel to prismatic battery cell 1 that has internally short-circuited. In a state where one of prismatic battery cells 1 has internally short-circuited, CID 8B provided in a parallel battery connected in parallel to this prismatic battery cell 1 operates to interrupt an inflow current of the parallel battery.

Figure 6:
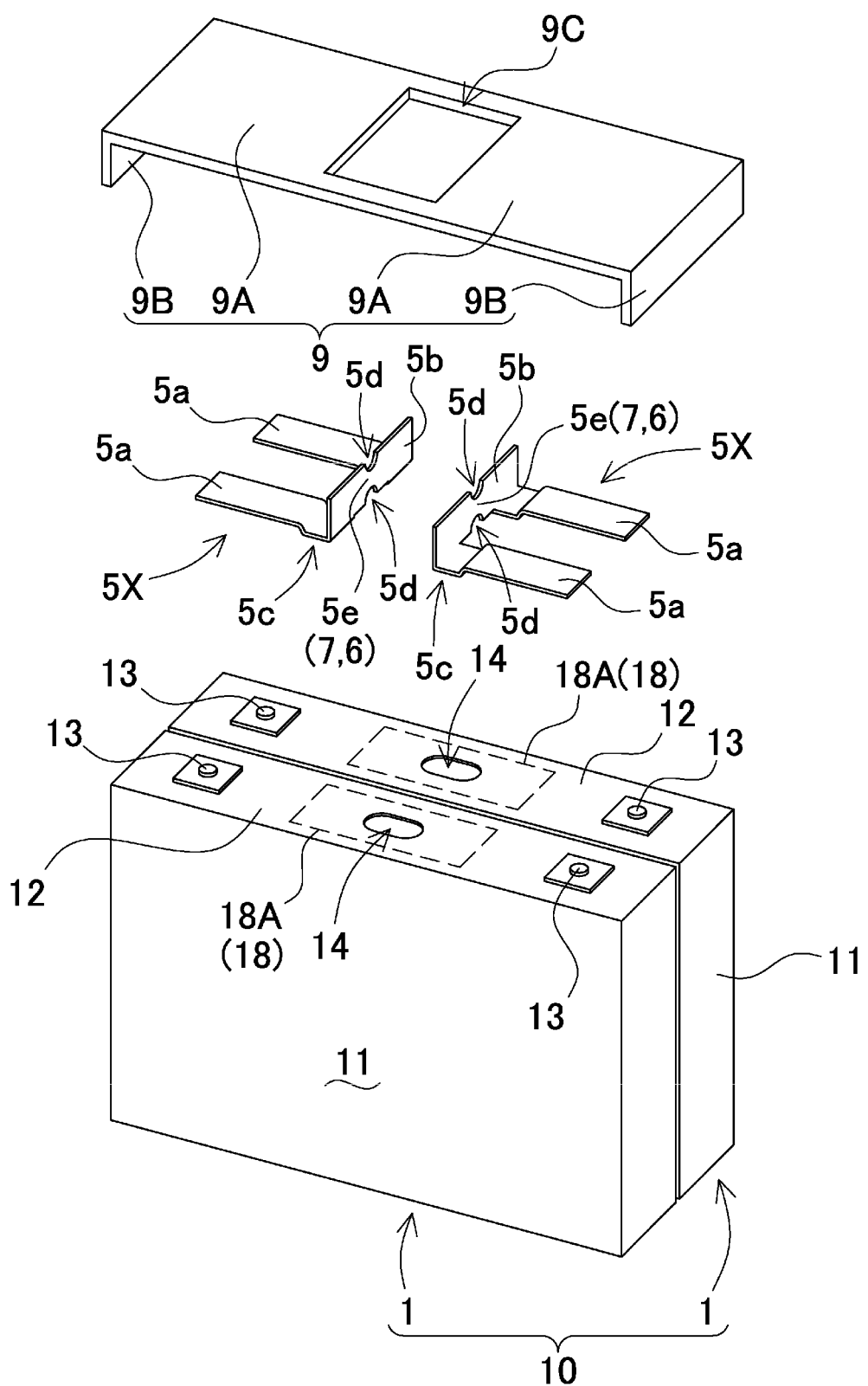
FIG. 6 is an exploded perspective view showing an example of parallel-connected bus bars including a fuse part.

Further, the battery system may use fuse parts 7 provided in parallel-connected bus bars 5X as safety mechanism 6 that interrupts a current path between prismatic battery cells 1 connected in parallel via parallel-connected bus bars 5X. Parallel-connected bus bar 5X shown in FIG. 6 is provided with fuse part 7 at a center of coupling part 5b, which is an intermediate portion of parallel-connected bus bar 5X. Parallel-connected bus bar 5X shown in the figure is provided with cutouts 5*d* on both sides of a metal sheet constituting coupling part 5*b* and thus narrow part 5*e* at a center of coupling part 5*b*, and this narrow part 5*e* serves as fuse part 7 that is blown by an excessive inflow current. Particularly, fuse parts 7 thus formed in parallel-connected bus bars 5X short-circuit the parallel battery as a part of short circuitry constituted by parallel-connected bus bars 5X and sealing plate 12 that are made of metal, so that an extremely large inflow current flows through parallel-connected bus bars 5X, allowing fuse parts 7 to instantaneously blow for sure.

Fuse part 7 formed in parallel-connected bus bar 5X is blown by heat generated by an excessive inflow current flowing through the parallel battery. Meanwhile, this parallel-connected bus bar 5X is heated due to conduction of heat generated in prismatic battery cell 1 that has internally short-circuited, so that fuse part 7 is heated by this heat, resulting in another effect of promotion of fusing and prompt blowing of fuse part 7 in a short time.

Although not shown, the fuse part provided in the parallel-connected bus bar may be a fuse part as a portion of the coupling part, which is a metal sheet, formed to be thin and to have a substantially reduced cross-sectional area by a pressing or cutting process, to be blown by an excessive inflow current.

In battery system 100 in FIG. 1, a plurality of prismatic battery cells 1 are connected in parallel by parallel-connected bus bars 5X to constitute parallel battery unit 10, and parallel battery units 10 are further connected in series by series-connected bus bar 5Y. In battery system 100 in FIG. 1, two adjacent prismatic battery cells 1 are connected in parallel to constitute parallel battery unit 10 and adjacent parallel battery units 10 are further connected in series, via bus bars 5. However, in the battery system of the present invention, a parallel battery unit is not necessarily constituted by two connected prismatic battery cells, and may be constituted by three or more connected prismatic battery cells, or all prismatic battery cells may be connected in parallel.

The battery system described above is optimal for a power source for vehicles that supplies electric power to a motor for running an electric vehicle. Electric vehicles each equipped with the battery system may include electric vehicles such as a hybrid vehicle and a plug-in hybrid vehicle that run on both an engine and a motor, and an electric car that runs only on a motor. The buttery system is used as a power source for these electric vehicles.

Battery System for Hybrid Vehicles

Figure 7:
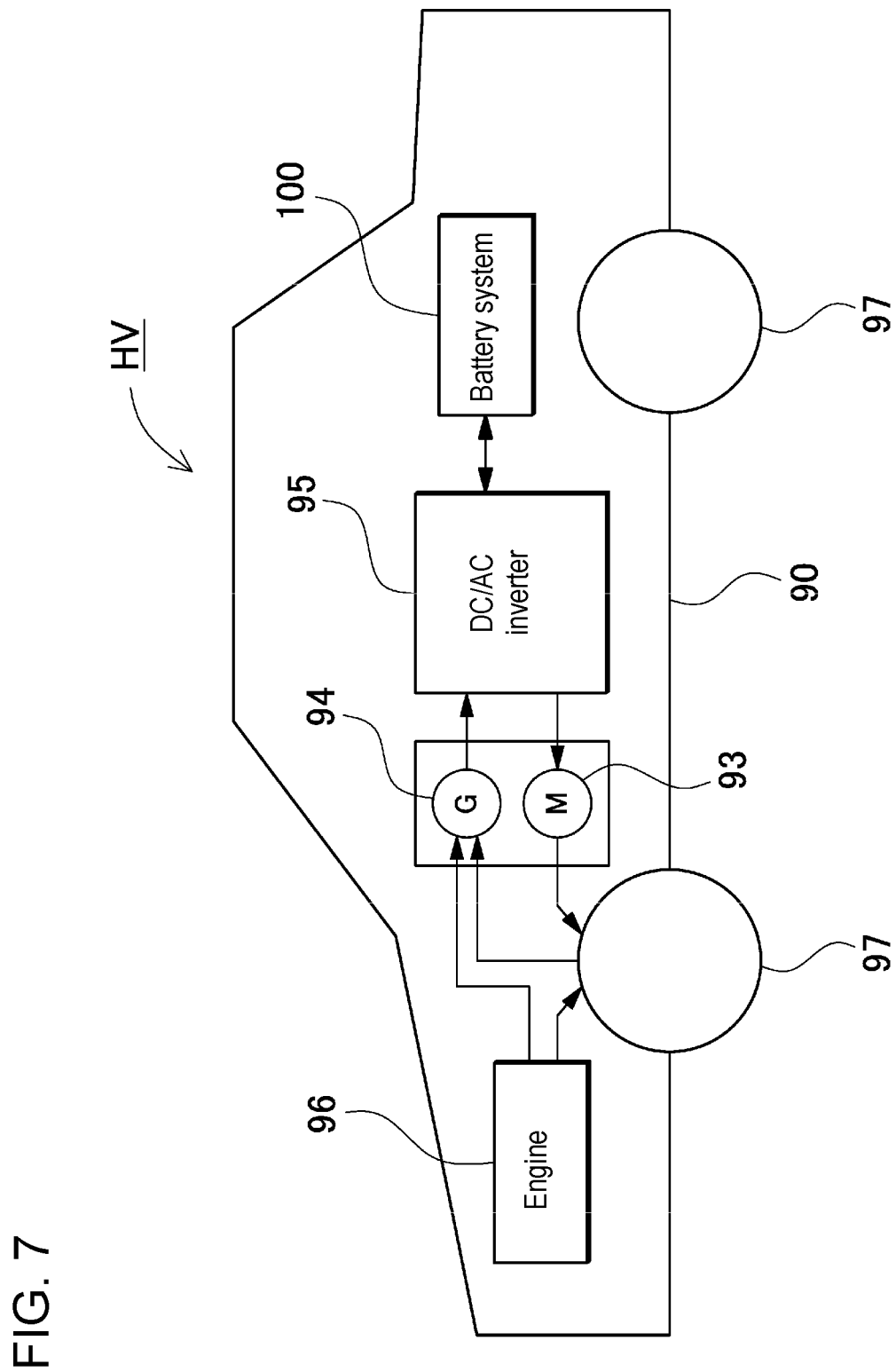
FIG. 7 is a block diagram showing an example in which the battery system is mounted in a hybrid vehicle that runs on an engine and a motor.

FIG. 7 shows an example in which the battery system is mounted in a hybrid vehicle that runs on both an engine and a motor. Vehicle HV equipped with the battery system shown in this figure includes vehicle body 90, engine 96 and motor 93 for running vehicle body 90, battery system 100 that supplies electric power to motor 93, generator 94 that charges batteries of battery system 100, and wheels 97 that are driven by motor 93 and engine 96 to run vehicle body 90. Battery system 100 is connected to motor 93 and generator 94 via DC/AC inverter 95. Vehicle HV runs on both motor 93 and engine 96 while the batteries of battery system 100 are charged and discharged. Motor 93 is driven to run the vehicle in a region where engine efficiency is low, for example, during acceleration or low speed running. Motor 93 is driven by electric power supplied from battery system 100. Generator 94 is driven by engine 96 or by regenerative braking when the vehicle is braked, to charge the batteries of battery system 100.

Battery System for Electric Cars

Figure 8:
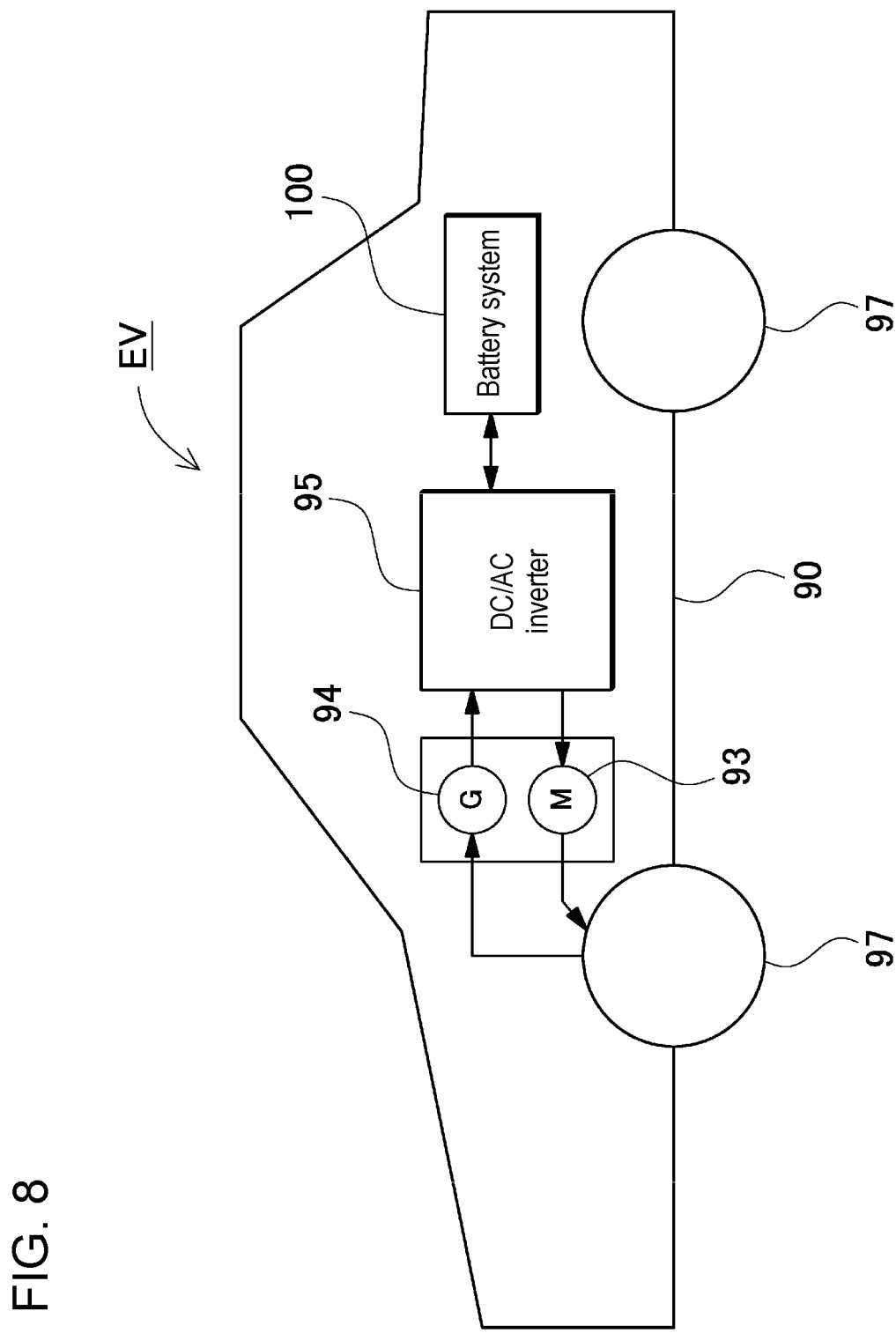
FIG. 8 is a block diagram showing an example in which the battery system is mounted in an electric car that runs only on a motor.

FIG. 8 shows an example in which the battery system is mounted in an electric car that runs only on a motor. Vehicle EV equipped with the battery system shown in this figure includes vehicle body 90, motor 93 for running vehicle body 90, battery system 100 that supplies electric power to this motor 93, generator 94 that charges batteries of this battery system 100, and wheels 97 that are driven by motor 93 to run vehicle body 90. Motor 93 is driven by electric power supplied from battery system 100. Generator 94 is driven by energy resulting from regenerative braking of vehicle EV, to charge the batteries of battery system 100.

Battery System for Power Storage

Figure 9:
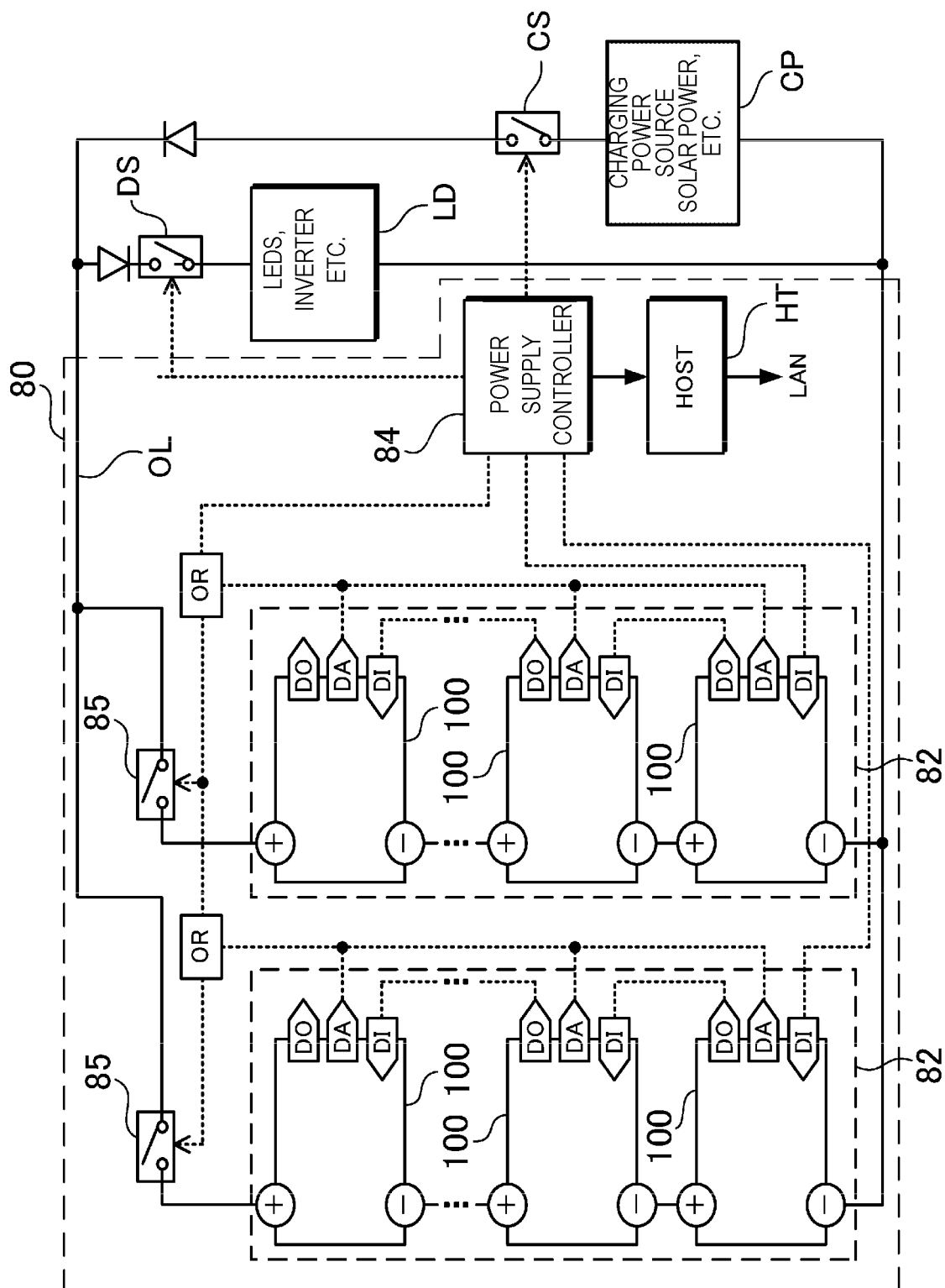
FIG. 9 is a block diagram showing an example in which the battery system is used for a power storage device.

Application of the battery system according to the present invention is not limited to a battery system mounted in an electric vehicle. For example, the battery system according to the present invention can be used as a battery system for a power storage device that stores natural energy, such as solar power generation, wind power generation, or the like, and can also be used for any application that stores large electric power, such as a battery system for a power storage device that stores late-night power. For example, the battery system can also be utilized for a power supply system that is charged with sunlight or late-night power and discharges when necessary as a power source for households and factories, for a power source for street lights that is charged with sunlight during daytime and discharges at night, for a backup power source for traffic lights that is driven during a power failure, or the like. Such an example is shown in FIG. 9. An application example shown as a power storage device in FIG. 9 illustrates large-capacity, high-output power storage device 80 including several battery systems described above connected in series and in parallel for achieving desired electric power, and in addition, a necessary controlling circuit.

Power storage device 80 shown in FIG. 9 has power source units 82 constituted by a plurality of battery systems 100 connected as a unit. Each battery system 100 has a plurality of prismatic battery cells connected in series and/or in parallel. Each battery system 100 is controlled by power supply controller 84. In this power storage device 80, power source units 82 are charged with charging power source CP and then drive load LD. Thus, power storage device 80 has a charge mode and a discharge mode. Load LD and charging power source CP are connected to power storage device 80 via discharge switch DS and charge switch CS, respectively. Power supply controller 84 of power storage device 80 turns on/off discharge switch DS and charge switch CS. In the charge mode, power supply controller 84 turns on charge switch CS and turns off discharge switch DS to permit charging from charging power source CP to power storage device 80. Upon completion of charging and at full charge, or in response to a request from load LD in a state where charging level is a predetermined value or more, power supply controller 84 turns off charge switch CS and turns on discharge switch DS to switch to the discharge mode and permit discharging from power storage device 80 to load LD. If necessary, both charge switch CS and discharge switch DS may be turned on for supplying electric power to load LD and charging power storage device 80 simultaneously Load LD driven by power storage device 80 is connected to power storage device 80 via discharge switch DS. In the discharge mode of power storage device 80, power supply controller 84 turns on discharge switch DS for connecting to load LD, which is thus driven by electric power from power storage device 80. A switching element such as a field effect transistor (FET) can be utilized as discharge switch DS. Power supply controller 84 of power storage device 80 controls ON/OFF of discharge switch DS. Power supply controller 84 includes a communication interface for communicating with external devices. In the example in FIG. 9, power supply controller 84 is connected to host device HT according to an existing communication protocol such as Universal Asynchronous Receiver/Transmitter (UART) or RS-232C. If necessary, a user interface may be further included for a user to operate the power supply system.

Each battery system 100 includes signal terminals and power source terminals. The signal terminals include input/output terminal DI, abnormality output terminal DA, and connecting terminal DO. Input/output terminal DI is a terminal for inputting and outputting signals from another battery system 100 and power supply controller 84. Connecting terminal DO is a terminal for inputting and outputting signals from and to another battery system 100. Abnormality output terminal DA is a terminal for outputting signals indicating abnormality of battery system 100 to an outside. The power source terminal is a terminal for connecting battery systems 100 in series and in parallel to each other. Power source units 82 are connected to output line OL via parallel-connected switch 85 and are connected in parallel to each other.

INDUSTRIAL APPLICABILITY

The battery system and the method for interrupting an inflow current of the battery system according to the present invention can be preferably utilized as a battery system for a plug-in hybrid electric vehicle and a hybrid electric vehicle capable of switching between an EV running mode and an HEV running mode, an electric car, and the like. The battery system and the method for interrupting an inflow current of the battery system according to the present invention can also be appropriately utilized for application such as a backup power source mountable in a computer server rack, a backup power source for a wireless base station for cellular phones and the like, a power source for power storage for households and factories, a power storage device combined with a solar battery such as a power source for street lights, and a backup power source for traffic signals.

The invention claimed is:

1. A method for interrupting an inflow current of a battery system, the battery system including:

a plurality of prismatic battery cells each having a sealing plate provided with electrode terminals that are positive and negative, at least one of the electrode terminals being fixed to the sealing plate in an insulated state;

parallel-connected bus bars each connecting the plurality of prismatic battery cells in parallel; and a safety mechanism configured to be capable of interrupting a current path of the prismatic battery cells connected in parallel by the parallel-connected bus bars, the method comprising:

the sealing plate of one of the prismatic battery cells convexly deforming due to a rise in an internal pressure of the one of the prismatic battery cells when an abnormality occurs;

bringing the sealing plate that has convexly deformed into contact with a positive bus bar and a negative bus bar connecting positive electrodes and negative electrodes, respectively, of the one of the prismatic battery cells and corresponding one of the prismatic battery cells connected in parallel to the one of the prismatic battery cells, such that the positive bus bar and the negative bus bar are short-circuited via the sealing plate to form external short circuitry between the electrode terminals that are positive and negative of the corresponding one of the prismatic battery cells connected in parallel to the one of the prismatic battery cells with the abnormality; and the external short circuitry activating the safety mechanism that interrupts a current flowing into the one of the prismatic battery cells with the abnormality.

2. The method for interrupting an inflow current of the battery system according to claim 1, wherein the prismatic battery cells include a top cover disposed at a fixed position being a position facing a side opposite to surfaces of the parallel-connected bus bars, the surfaces facing the sealing plate, the method comprising pressing the parallel-connected bus bars against the sealing plate by the top cover in contact with the parallel-connected bus bars pushed out by the sealing plate that has convexly deformed.

3. The method for interrupting an inflow current of the battery system according to claim 1, wherein the safety mechanism is a current interrupt device (CID) built in each of the prismatic battery cells.

4. The method for interrupting an inflow current of the battery system according to claim 1, wherein the safety mechanism is a fuse part provided in one of the parallel-connected bus bars.

5. The method for interrupting an inflow current of the battery system according to claim 1, wherein a pair of the electrode terminals is fixed to the sealing plate in an insulated state.

* * * * *